(12) United States Patent
Maciejewski et al.

(10) Patent No.: US 6,382,801 B1
(45) Date of Patent: May 7, 2002

(54) SUBMARINE PERISCOPE EYEGUARD HOUSING ASSEMBLY

(75) Inventors: Wendell C. Maciejewski, Wakefield; Riad Sayegh, West Kingston, both of RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/845,227

(22) Filed: May 1, 2001

(51) Int. Cl.[7] .......................... G02B 21/00; G02B 23/08
(52) U.S. Cl. .................. 359/600; 359/402; 359/406; 359/511
(58) Field of Search .................. 359/399, 403, 359/404–409, 411, 414, 416–418, 507, 511, 600–601, 611–614, 808–812, 815–819, 827–830; 396/448

(56) References Cited

U.S. PATENT DOCUMENTS

| | | | | |
|---|---|---|---|---|
| 683,012 A | * | 9/1901 | Hill | ........................... 359/600 |
| 2,100,940 A | * | 11/1937 | Coleman | .................... 359/600 |
| 4,729,648 A | * | 3/1988 | Armstrong | ................. 359/600 |
| 4,810,078 A | * | 3/1989 | Armstrong | ................. 359/600 |
| 6,226,134 B1 | * | 5/2001 | Davis | ........................ 359/822 |

* cited by examiner

*Primary Examiner*—Thong Nguyen
(74) *Attorney, Agent, or Firm*—Michael J. McGowan; Michael F. Oglo; Prithvi C. Lall

(57) ABSTRACT

A submarine periscope eyeguard housing assembly includes a viewing lens housing having a viewing lens aperture and viewing lens therein, first and second arm members fixed to the viewing lens housing and extending therefrom, a first blinder mounted on the first arm member, and a second blinder mounted on the second arm member. A first eyeguard is mounted on the first blinder for engagement by a left eye area of a viewer's head, and a second eyeguard is mounted on the second blinder for engagement by a right eye area of the viewer's head. A third eyeguard is rotatably mounted on the viewing lens housing and is adapted to be rotated into a selected one of a first position complementary to the first eyeguard and a second position complementary to the second eyeguard.

17 Claims, 7 Drawing Sheets

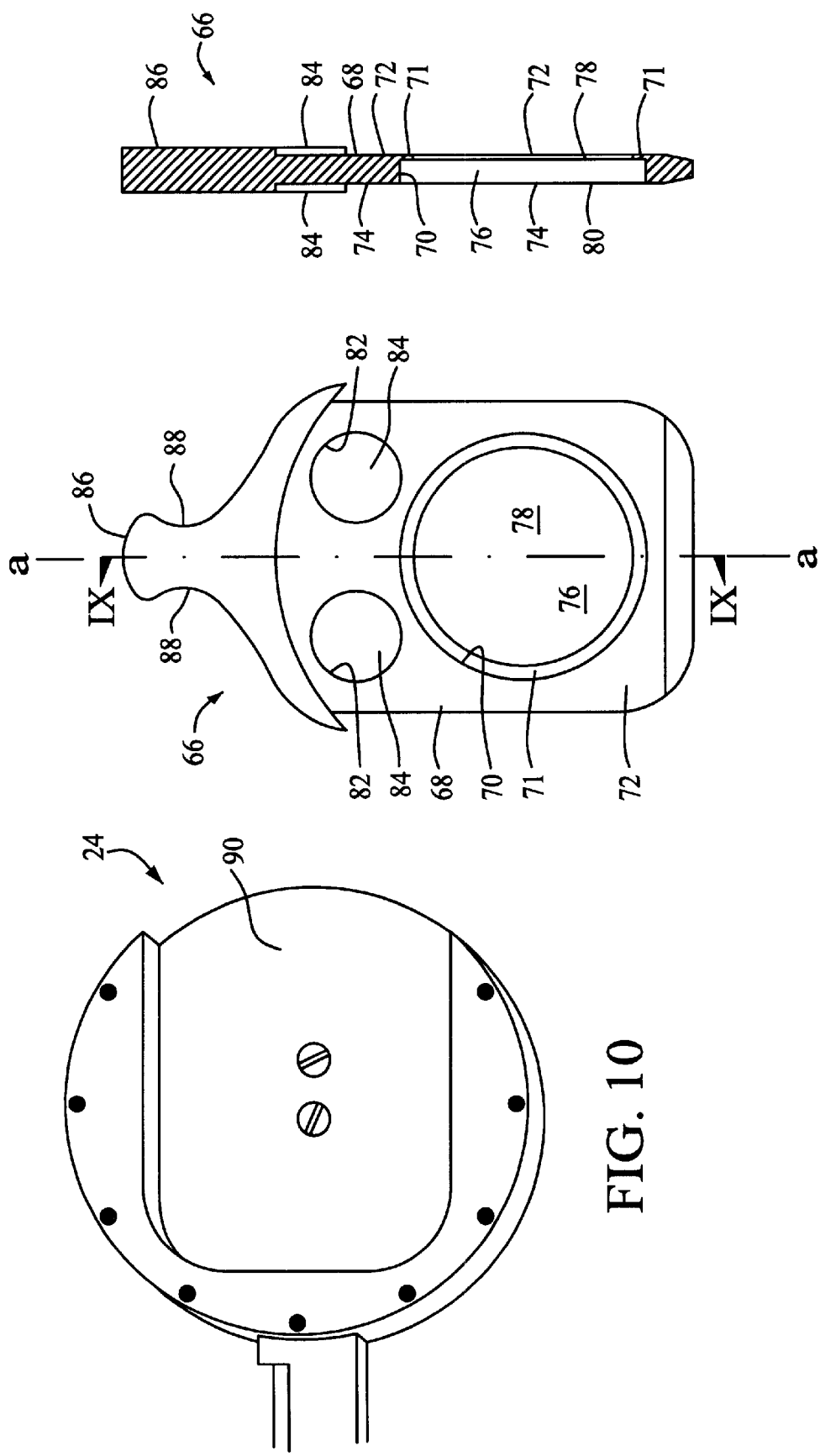

SUBMARINE PERISCOPE EYEGUARD HOUSING ASSEMBLY

STATEMENT OF GOVERNMENT INTEREST

The invention described herein may be manufactured and used by and for the Government of the United States of America for Governmental purposes without the payment of any royalties thereon or therefor.

CROSS-REFERENCE TO RELATED PATENT APPLICATIONS

Not applicable.

BACKGROUND OF THE INVENTION (1) Field of the Invention

The invention relates to submarine periscopes and is directed more particularly to an improved periscope eyeguard housing assembly.

(2) Description of the Prior Art

It is known to provide submarine periscope systems having one optical lens for viewing above sea level and two "blinders", which obstruct viewing and block out light. The purpose of a blinder is to enable the viewer to leave both eyes open during operation, while utilizing only one eye for viewing. An eyeguard housing is provided with a left eye and a right eye blinder. The entire eyeguard assembly can be oriented in two positions, right and left. In the left position, the viewer's left eye is at the blinder location. Similarly, in the right position the viewer's right eye is at the blinder location. The positions are achieved by rotating the entire eyeguard housing assembly 180°, with the center of rotation being the center of the one optical, or viewing, lens. The two positions are established to accommodate left or right eye dominant personnel. Experience has shown that in time the rotation of the assembly becomes rough and sometimes binding. Alternatively, the assembly sometimes loosens and fails to hold at the left or right position, or both.

The blinders are connected by arms to the optical lens housing and are fixed in place on the arms by a screw. To adjust the location of a blinder relative to the center of the viewing lens, it is necessary to loosen the screw, move the blinder on the arm, and reset the screw. The operation requires a screw driver, which often is not readily available, and some operator dexterity in accurately positioning and setting the blinder. The operation further is time consuming, which can be problematic in a target viewing situation.

The viewing lens housing often is provided with a sun filter. When the filter is not in use, there is no storage facility on the assembly therefor. Often, the small filters (about 1 ¼ inch in diameter) are set aside and eventually lost.

Accordingly, there is a need for an eyeguard housing assembly wherein it is unnecessary to rotate the entire assembly to switch between left and right eye operations. Further, there is a need for means in the assembly for effecting adjustments of viewing lens-to-blinder distances without the need of tools and screw loosing and tightening operations. Still further, there is a need for means on the assembly for storing filters when not in use.

SUMMARY OF THE INVENTION

An object of the invention is, therefore, to provide an improved submarine periscope eyeguard housing assembly having provision for switching between left and right eye operations without rotating the entire assembly.

A further object of the invention is to provide improved means for effecting adjustments of the distances between the viewing lens and the respective blinders without the need of a tool.

A still further object of the invention is to provide storage space in the eyeguard housing assembly for filters not in use.

With the above and other objects in view, as will hereinafter appear, there is provided a submarine periscope eyeguard housing assembly comprising a viewing lens housing having a viewing lens aperture and viewing lens therein, first and second arm members fixed to the viewing lens housing and extending therefrom in opposite directions and in lengthwise alignment with each other, a first blinder mounted on the first arm member, and a second blinder mounted on the second arm member. A first eyeguard is mounted on the first blinder for engagement by a left eye area of a viewer's head, and a second eyeguard is mounted on the second blinder for engagement by a right eye area of the viewer's head. A third eyeguard is rotatably mounted on the viewing lens housing and is adapted to be rotated into a selected one of a first position complementary to the first eyeguard and a second position complementary to the second eyeguard.

In accordance with a further feature of the invention, there is provided a submarine periscope eyeguard housing assembly comprising a viewing lens housing having a viewing lens aperture and viewing lens therein, an arm member fixed to the viewing lens housing and extending therefrom, and a blinder mounted at a selected location on the arm. A locking means is disposed on the blinder and is engageable with the arm to lock the blinder in a selected position on the arm, the locking means being releasable to permit movement of the blinder along the arm, and reengageable with the arm to lock the blinder in another selected location on the arm, to selectively determine a distance between the viewing lens housing and the blinder.

In accordance with a still further feature of the invention, there is provided a submarine periscope eyeguard housing assembly comprising a viewing lens housing having a viewing lens aperture and viewing lens therein, the viewing lens housing further having a filter retaining portion and defining a slot in communication with the filter retaining portion, such that a generally planar filter may be moved through the slot and into position in the filter retaining portion, the position being adjacent the viewing lens. An arm member is fixed to the viewing lens housing and extends therefrom. A blinder is mounted on the arm member and is provided with at least one slot for receiving and retaining the filter and other filters of like configuration. The filters may be stored in the blinder and removed therefrom and inserted into the viewing lens housing and vice-versa.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

Reference is made to the accompanying drawings in which is shown an illustrative embodiment of the invention, from which its novel features and advantages will be apparent, and wherein corresponding reference characters indicate corresponding parts throughout the several views of the drawings and wherein:

FIG. 10 is a perspective view of a blinder with parts removed to show an internal feature;

FIG. 11 is a front elevational view of a lens used in conjunction with the eyeguard housing assembly;

FIG. 12 is a sectional view taken along line XII—XII of FIG. 11; and

DESCRIPTION OF THE PREFERRED EMBODIMENT

Figure 1:
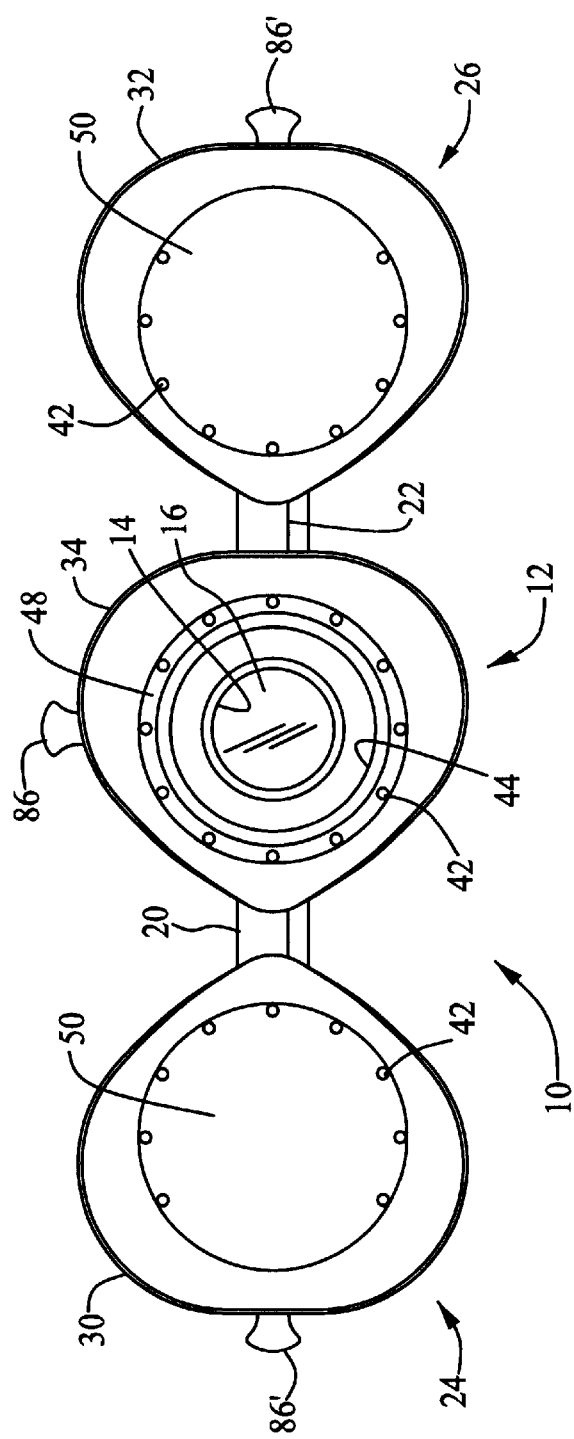
FIG. 1 is a rear elevational view of one form of submarine periscope eyeguard housing assembly illustrative of an embodiment of the invention.
Figure 2:
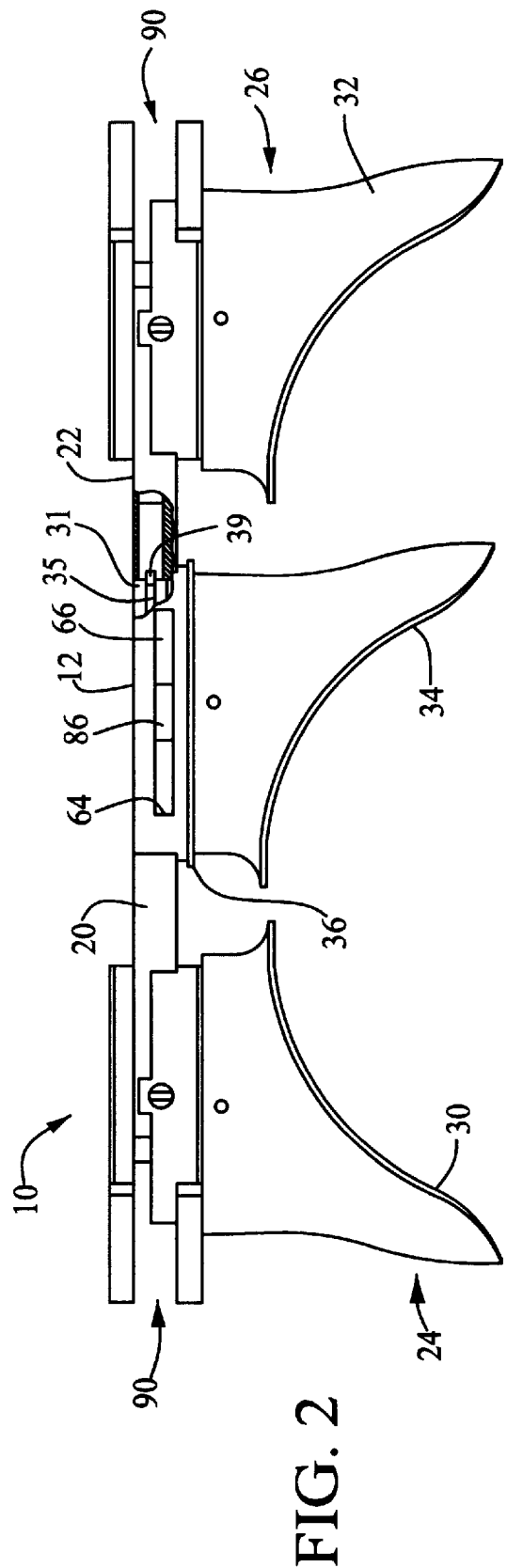
FIG. 2 is a top view thereof.

Referring to FIGS. 1 and 2, it will be seen that a submarine periscope eyeguard housing assembly 10 includes a viewing lens housing 12, which is fixed to a periscope eyebox (not shown). The viewing lens housing 12 is provided with a viewing lens aperture 14 in which is disposed a viewing lens 16.

First and second arm members 20, 22 are fixed to the viewing lens housing 12 and extend therefrom in opposite directions and in lengthwise alignment with each other. A first blinder 24 is mounted on first arm member 20 and a second blinder 26 is mounted on second arm member 22.

A first eyeguard 30 is mounted on first blinder 24 for engagement by a left eye area of a viewer's head, and a second eyeguard 32 is mounted on second blinder 26 for engagement by a right eye area of the viewer's head. A third eyeguard 34 is rotatably mounted on the viewing lens housing 12 for rotative movement into a selected first position, shown in FIGS. 1 and 2, wherein the third eyeguard 34 is complementary to first eyeguard 30, for right eye viewing. The third eyeguard 34 is further rotatable to a second position in which third eyeguard 34 is complementary to second eyeguard 32, for left eye viewing.

Each eyeguard includes an annularly-shaped ring 38 (FIG. 4) having a multiplicity of holes 40 extending therethrough and adapted to receive screws 42 for securing the eyeguard assembly to a viewing lens housing annular cover member 36. The ring 38 defines a central viewing opening 44.

The flexible eyeguard 34 is integral with the ring 38 and is configured to conform generally to an eye area of a viewer's head. The eyeguard 34 is provided with a plurality of vent holes 46. The vent holes 46 prevent a vacuum from developing when the operator presses against flexible eyeguard 34.

A rigid annulus 48 overlies ring 38 and is provided with apertures 40a aligned with the ring holes 40, such that heads of screws 42 received by apertures 40a engage rigid annulus 48 and not the flexible ring 38.

The ring 38 and eyeguard 34 preferably are of durable neoprene rubber of high durometer.

Figure 2A:
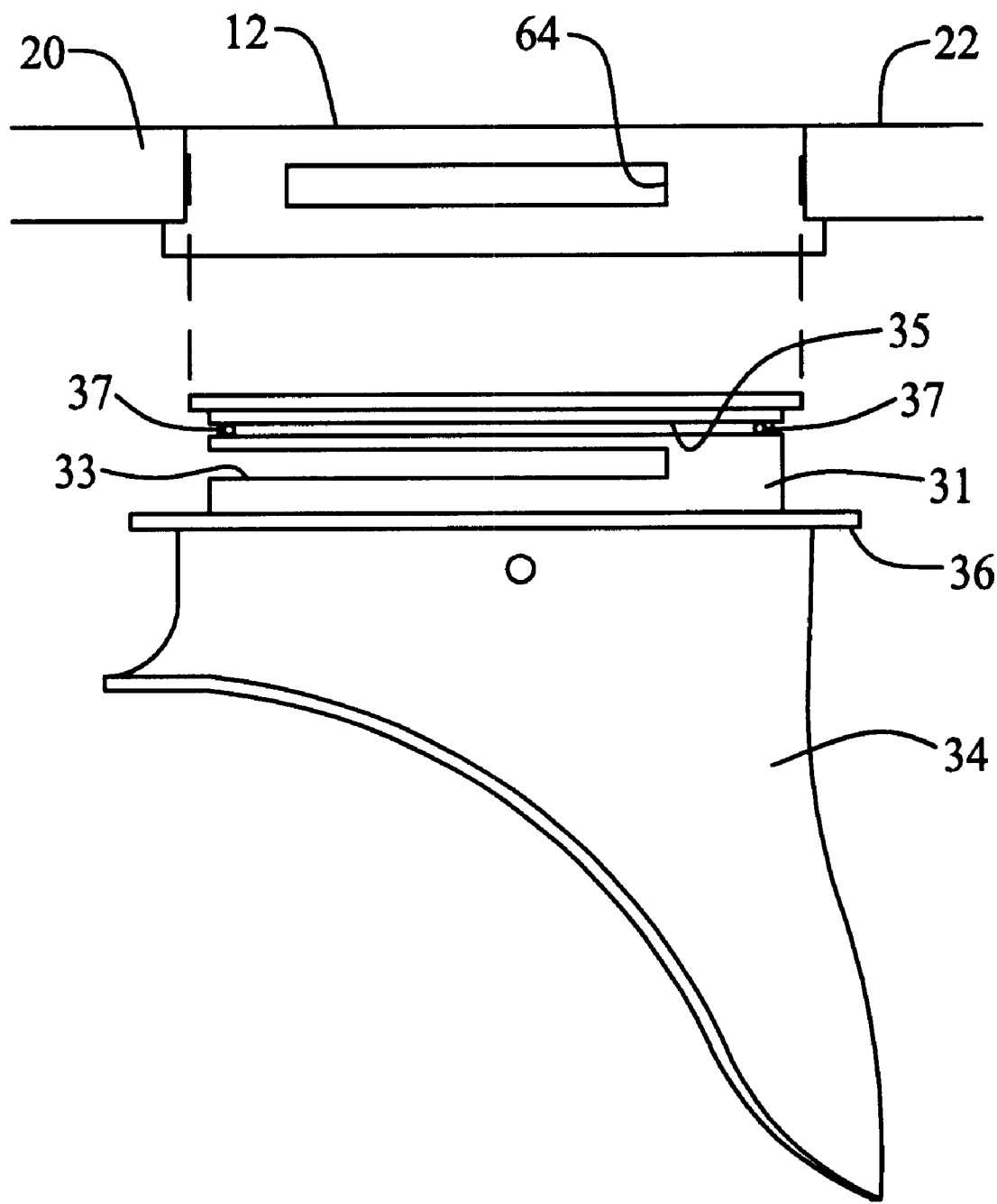
FIG. 2A is an enlarged illustration of a portion of FIG. 2.

Referring to FIGS. 2 and 2A, it will be seen that extending from the annular member 36 is a barrel portion 31 having a slot 33 therein. The barrel portion 31 is further provided with an annular groove 35 in which are disposed opposed recesses 37 for receiving spring-biased detents 39. The barrel portion 31 is rotatably disposed in lens housing 12.

Figure 3:
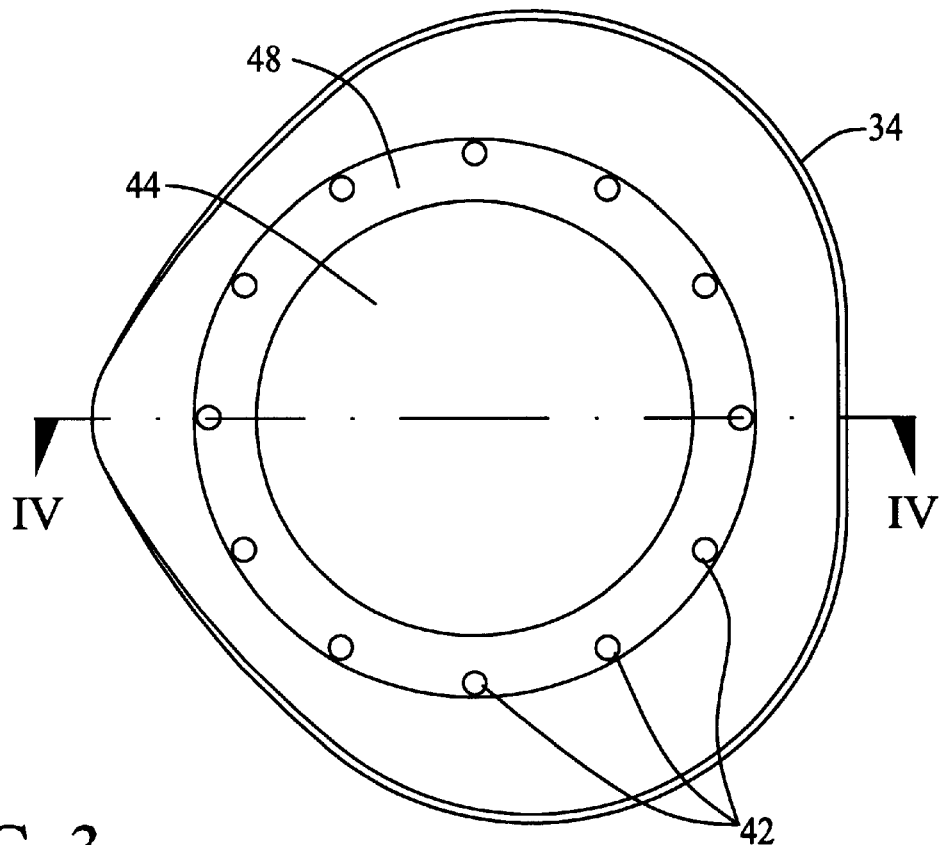
FIG. 3 front elevational view of a central eyeguard assembly.
Figure 4:
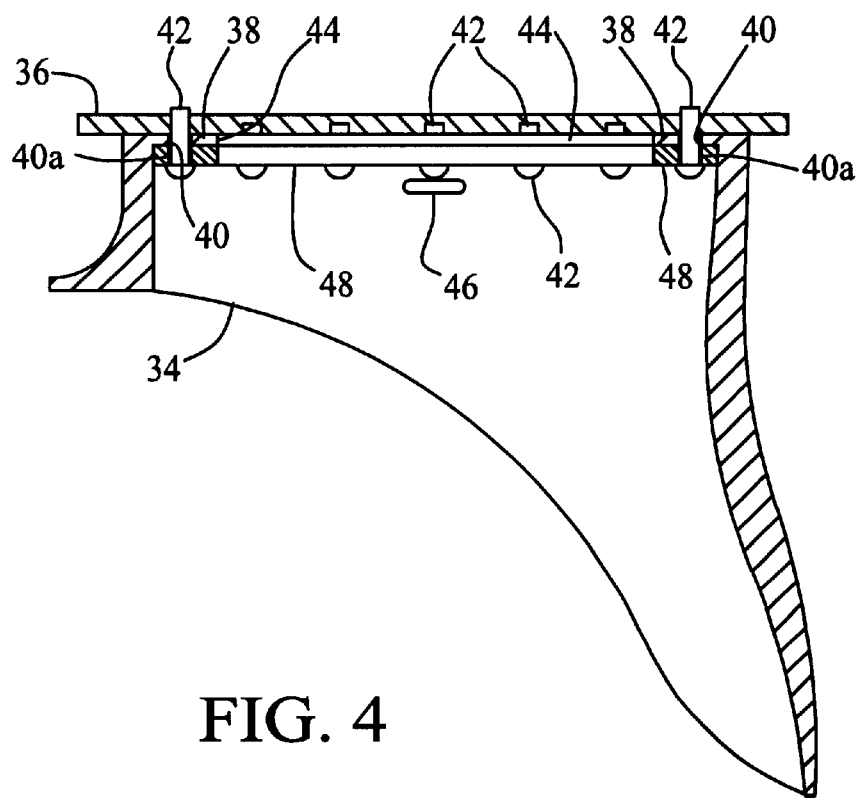
FIG. 4 is a sectional view taken along line IV—IV of FIG. 3.
Figure 5:
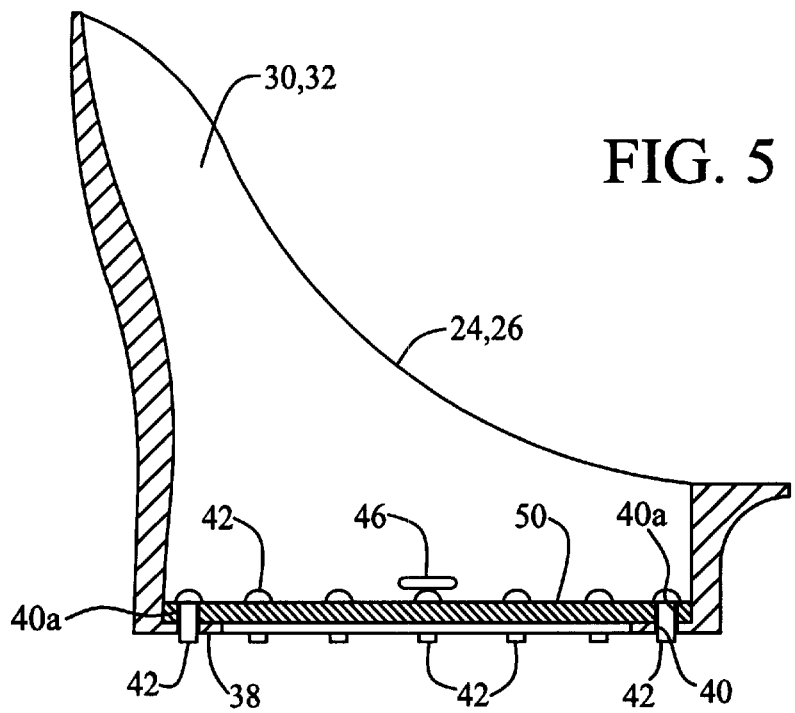
FIG. 5 is similar to FIG. 4 but showing a blinder eyeguard assembly.

Referring to FIG. 5, it will be seen that the blinder assemblies 24, 26 are constructed similarly to the viewing lens assembly of FIGS. 3 and 4, the principal differences being that instead of the rigid annulus 48, the blinder assemblies are provided with a plate 50 which prevents the passage of light through the blinder assembly.

Figure 6:
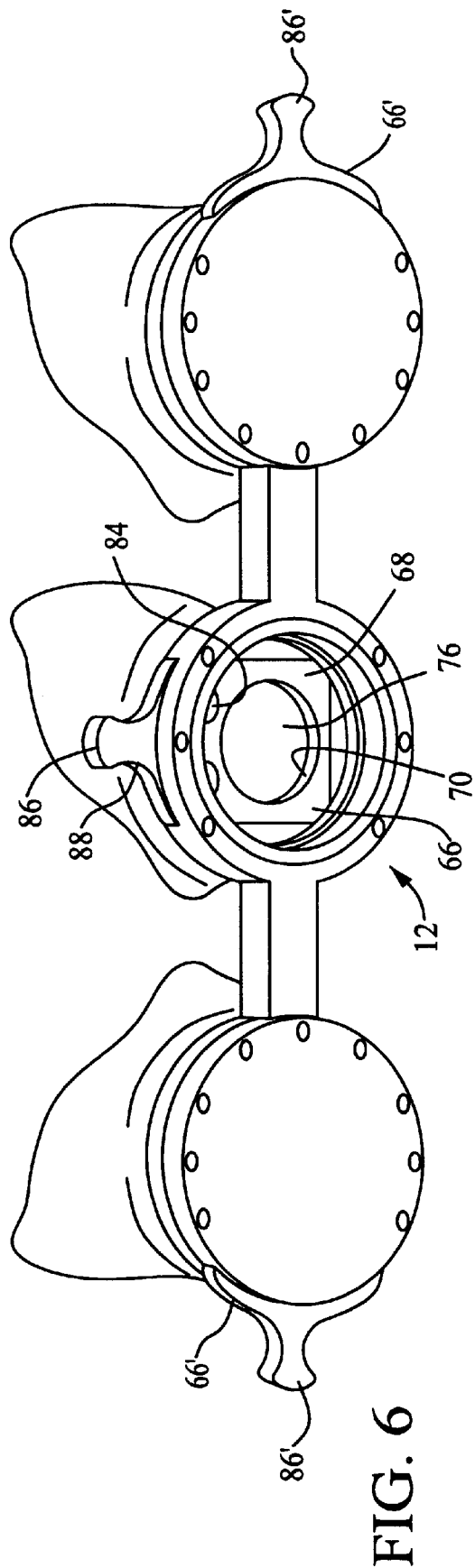
FIG. 6 is a perspective view of the assembly of FIGS. 1 and 2, with some parts removed for illustration of internal features.

In operation, when it is desired to convert the periscope eyeguard housing assembly 10 from one selected eye configuration to the other, an operator merely grasps annular member 36 and rotates the same 180°. In both the left and right eye positions, the spring biased detents 39 engage the groove recesses 37 to hold the third eyeguard 34 in place. When it is desired to reverse the position of the eyeguard 34, the detents 39 readily retract under pressure to permit rotation of the barrel portion 31, the detents 39 riding in the groove 35 until again engaging the recesses 37. The blinders 24, 26 remain stationary, being held in place on their respective arm members 20, 22 by spring-biased plungers mounted in the blinders and engageable with teeth on the arm members, as described hereinbelow. Rotation of the annular member 36 carries with it rotation of the viewing eyeguard 34, such that eyeguard 34 is switched from a position complementary to one of eyeguards 30, 32 to the other of eyeguards 30, 32, as from a right eye arrangement (FIGS. 1 and 2) to a left eye arrangement (FIG. 6).

Figure 7:
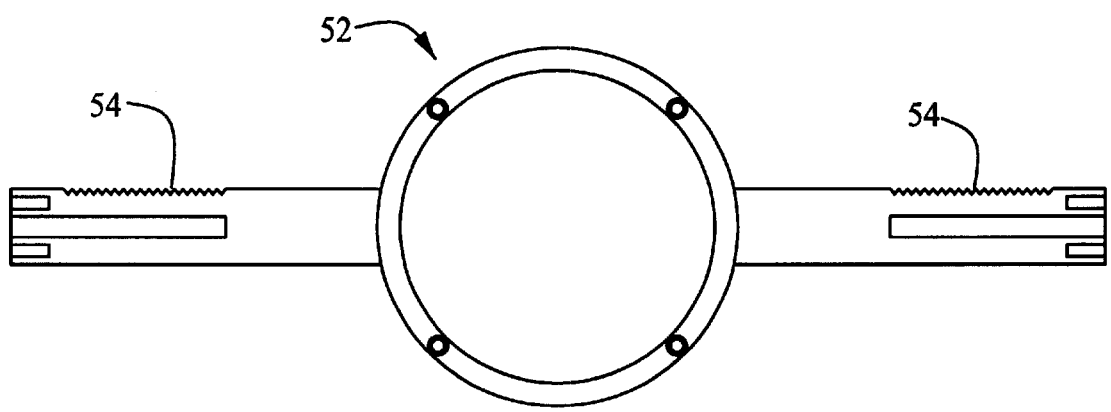
FIG. 7 is a front elevational view of a portion of the assembly of FIG. 1.
Figure 8:
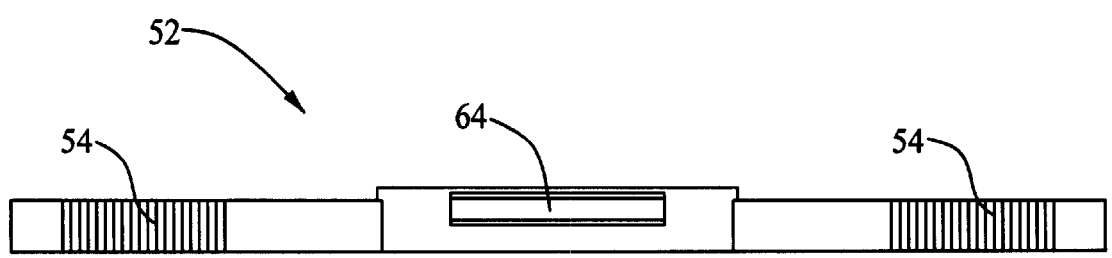
FIG. 8 is a top view of the assembly portion of FIG. 7.
Figure 9:
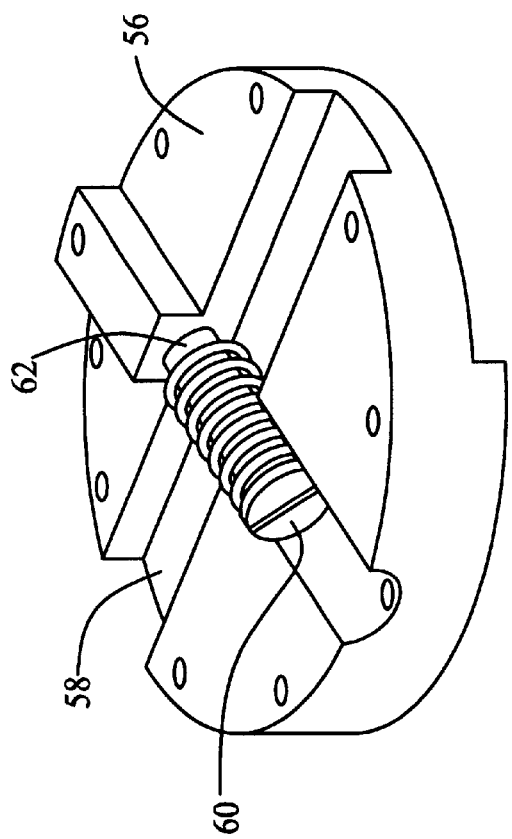
FIG. 9 is a perspective view of a portion of a blinder assembly.

Referring to FIGS. 7 and 8, it will be seen that a frame member 52 includes the arm members 20, 22, which are each provided with teeth 54 on a surface thereof. Each blinder assembly 24, 26 includes a cover member 56 (FIG. 9) in which is formed a channel 58. An arm member 20, 22 is slidingly moveable in the channel 58. The cover member 56 is further provided with a spring-biased plunger 60 having an end portion 62 engageable with teeth 54 to lock the blinder in place on the arm member.

When a change in interpupilary distance is desired, a blinder is firmly urged by an operator in the desired direction. The spring bias of plunger 60 is such as to permit plunger end portion 62 to ride over teeth 54 until the blinder movement stops, whereupon the plunger end portion again lockingly engages teeth 54 to hold the blinder in a selected position. Thus, the distance from each blinder to the viewing lens housing is easily adjusted without the need of a tool.

As is shown in FIGS. 2 and 8, the viewing lens housing 12 is provided with a slot 64. The slots 64 and 33 are adapted to receive a lens holder 66 of the type shown in FIGS. 11 and 12. The lens holder 66 includes a generally planar frame 68 defining a window 70 having a lip 71 therein disposed along a periphery of window 70. The frame 68 is provided with first and second planar side surfaces 72, 74. The lip 71 is an extension of first side surface 72. The frame 68 preferably is of metal, such as aluminum.

A lens 76 is disposed in window 70 and is adjacent lip 71. The lens 76 is of a thickness such that a peripheral portion of a first major surface 78 of lens 76 is fixed to lip 71. A second major surface 80 of lens 76 is flush with frame second surface 74. The lens 76 preferably is fixed to lip 71 by adhesive, or the like. As seen in FIG. 11, lens 76 preferably is circular and lip 71 is an annulus, as shown, or one or more portions of an annulus. The lens preferably is of glass or a plastics material, or a composite thereof. The lens may be of clear glass, or of a prescription-type glass for enhancing eyesight, or increasing the focus range of the periscope at both ends of the usual periscope range of focus, or a filter of darkened glass, similar to sun-glasses, or a mirrored glass for substantial sun filtering, or may be omitted altogether, such that viewing occurs through the lens assembly without benefit of a lens of any type.

The frame 68 is further provided with at least one opening 82 (two shown in FIG. 11) in which is fixed a magnet 84. When two magnets 84 are provided, the magnets preferably are disposed, respectively, on opposite sides of a lengthwise axis a—a (FIG. 11) and are in substantial alignment widthwise.

A grip 86 extends from frame 68 and preferably comprises a protrusion integral with frame 68. The grip 86 is provided with opposed recessed portions 88 (FIG. 11) to facilitate gripping thereof by an operator. The lens holder 66 may be inserted into and withdrawn from the lens holder slot 64 and the barrel portion slot 33 aligned with the lens holder slot 64, as desired. In FIG. 6 there is shown a lens holder 66 in place in the viewing lens housing 12.

Figure 13:
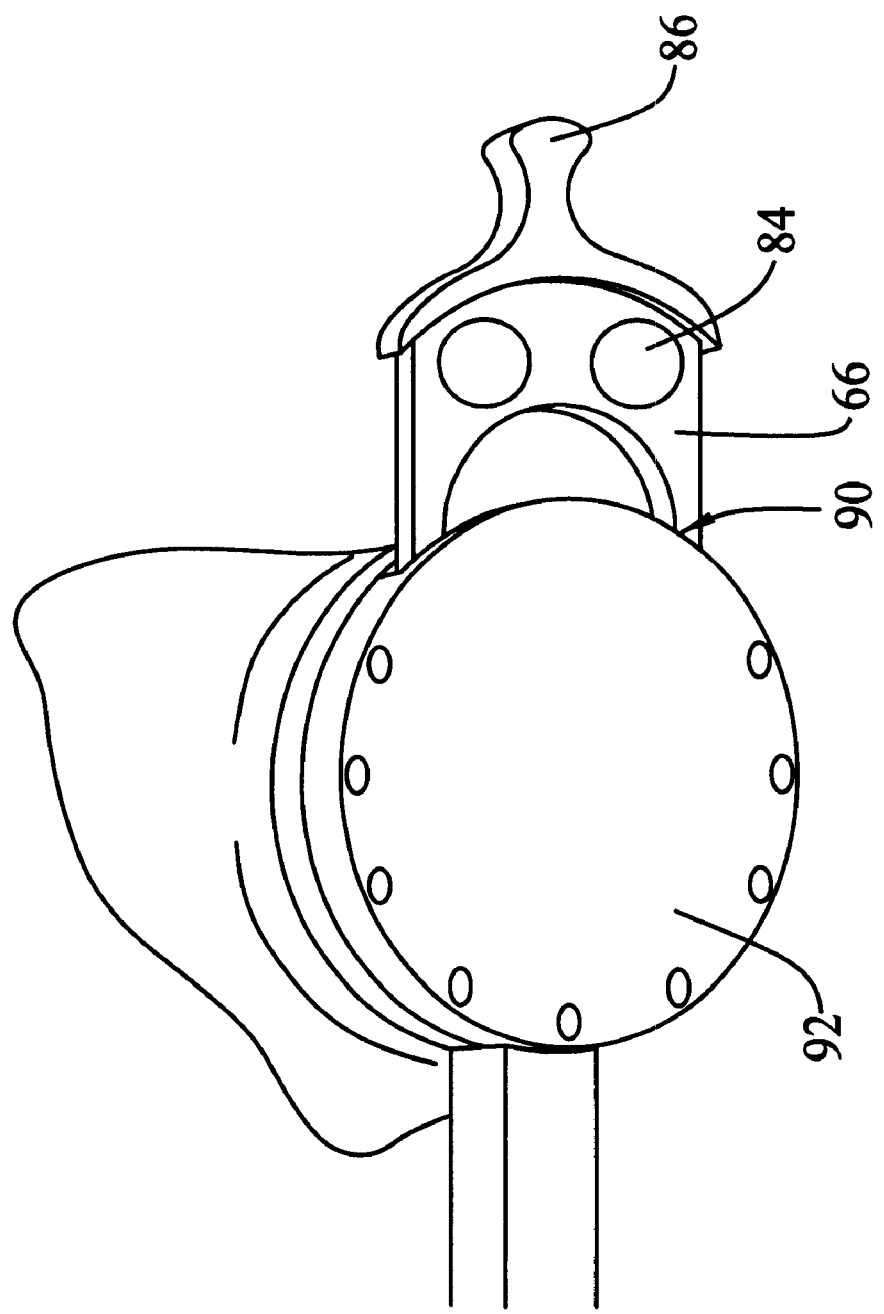
FIG. 13 is a perspective view showing the cooperation between the lens of FIGS. 8 and 9 and a blinder assembly.

When not in use, the lens holder 66 and/or other lens holders 66', having grips 86' (FIG. 1), may be disposed in slots 90 in blinders 24, 26. In FIG. 10 there is shown a portion of one of the slots 90 configured to receive a lens holder 66. In FIG. 13, a back plate 92 has covered a side of the slot 90 shown exposed in FIG. 10 and a lens holder 66 is shown in a partially inserted position. Further movement of the lens holder 66 into the slot 90 carries the lens holder 66 fully into the slot 90, as shown in FIGS. 1 and 6.

Thus, when a lens holder 66 is not in use in the viewing lens housing slot 64, it may be slid into a blinder slot 90 for safe keeping.

There is thus provided an improved submarine periscope eyeguard housing assembly wherein shifting between left and right eye operation requires minimal movement of parts, wherein lens-to-blinder distances may be modified quickly and without the need of a tool, and wherein lenses not in use may be stored safely and within convenient reach of an operator.

It will be understood that many additional changes in the details, materials, and arrangement of parts, which have been herein described and illustrated in order to explain the nature of the invention, may be made by those skilled in the art within the principles and scope of the invention as expressed in the appended claims.

What is claimed is:

1. A submarine periscope eyeguard housing assembly, said assembly comprising:

a viewing lens housing having a viewing lens aperture and viewing lens therein;

first and second arm members fixed to said viewing lens housing and extending therefrom in opposite directions and in lengthwise alignment with each other;

a first blinder mounted on said first arm member;

a second blinder mounted on said second arm member;

a first eyeguard mounted on said first blinder for engagement by a left eye area of a viewer's head;

a second eyeguard mounted on said second blinder for engagement by a right eye area of the viewer's head; and a third eyeguard rotatably mounted on said viewing lens housing and adapted to be rotated into a selected one of a first position complementary to said first eyeguard and a second position complementary to said second eyeguard.

2. The eyeguard housing assembly in accordance with claim 1 wherein said first blinder is movable on said first arm member and said second blinder is movable on said second arm member.

3. The eyeguard housing assembly in accordance with claim 2 wherein said blinders are automatically locked in place on said arm members upon completion of selected movement of said blinders thereon.

4. The eyeguard housing assembly in accordance with claim 1 wherein said viewing lens housing defines a slot for receiving a lens holder and at least said first blinder is provided with a slot for receiving the lens holder, whereby the lens holder is received in a selected one of the viewing lens housing slot and the blinder slot.

5. The eyeguard housing assembly in accordance with claim 1 wherein said third eyeguard is fixed to an annular cover member which is rotatably disposed in said viewing lens housing.

6. A submarine periscope eyeguard housing assembly, said assembly comprising:

a viewing lens housing having a viewing lens aperture and viewing lens therein;

a first arm member fixed to said viewing lens housing and extending in a first direction therefrom;

a first blinder mounted at a first selected position on said first arm member;

first locking means on said blinder and engageable with said arm member to lock said blinder in the selected position on said arm member, said locking means being releasable to permit movement of said blinder along said arm member, and reengageable with said arm member to lock said blinder in another selected position on said arm member, to selectively determine a distance between said viewing lens housing and said blinder;

wherein said arm member is provided with an elongated series of teeth thereon, and said locking means comprise a plunger mounted on said blinder and engageable with the teeth to lock the blinder in the selected positions on the arm member.

7. The eyeguard housing assembly in accordance with claim 6 wherein said plunger is spring-biased toward engagement with the teeth.

8. A submarine periscope eyeguard housing assembly, said assembly comprising:

a viewing lens housing having a viewing lens aperture and viewing lens therein;

a first arm member fixed to said viewing lens housing and extending in a first direction therefrom;

a first blinder mounted at a first selected position on said first arm member;

first locking means on said blinder and engageable with said arm member to lock said blinder in the selected position on said arm member, said locking means being releasable to permit movement of said blinder along said arm member, and reengageable with said arm member to lock said blinder in another selected position on said arm member, to selectively determine a distance between said viewing lens housing and said blinder;

a second arm member fixed to said viewing lens housing and extending in a second direction therefrom opposite to the first direction and in lengthwise alignment with said first arm member;

a second blinder mounted at a second selected position on said second arm member; and a second locking means on said second blinder and engageable with said second arm member to lock said second blinder in a selected position on said second arm member, said second locking means being releasable to permit movement of said second blinder along said second arm member, and reengagable with said second arm member to lock said second blinder in another selected position on said second arm member, to selectively determine a second distance between said viewing lens housing and said second blinder.

9. The eyeguard housing assembly in accordance with claim 8 wherein said arm members each have an elongated series of teeth thereon, and said locking means comprise a plunger mounted on each of said blinders and engageable with the teeth to lock the blinders in the selected positions on the arm members.

10. The eyeguard housing assembly in accordance with claim 9 wherein said plunger is spring-biased toward engagement with the teeth.

11. The eyeguard housing assembly in accordance with claim 8 and further comprising a first eyeguard mounted on said first blinder, a second eyeguard mounted on said second blinder, and a third eyeguard mounted on said viewing lens housing, said third eyeguard being rotatable to complement a selected one of said first and second eyeguards.

12. The eyeguard housing assembly in accordance with claim 8 wherein said viewing lens housing defines a slot for receiving a lens holder for placing a selected lens adjacent the viewing lens, and at least said first blinder defines a slot for receiving the lens holder for storing the lens holder.

13. A submarine periscope eyeguard housing assembly, said assembly comprising;

a viewing lens housing having a viewing lens aperture and viewing lens therein, said viewing lens housing further having a filter retaining portion and defining a slot in communication with said filter retaining portion, such that a generally planar filter is movable through the slot and into position in the filter retaining portion, the position being adjacent said viewing lens;

a first arm member fixed to said viewing lens housing and extending in a first direction therefrom; and a first blinder mounted on said first arm member and having a slot for receiving and retaining said filter;

wherein the filters may be stored in said blinder and removed therefrom and inserted in said viewing lens housing and vice-versa.

14. The submarine periscope eyeguard housing assembly in accordance with claim 13 and further comprising:

a second arm member fixed to said viewing lens housing and extending in a second direction therefrom opposite to the first direction and in lengthwise alignment with said first arm member; and a second blinder mounted on said second arm member and having at least one slot for receiving and retaining said filter and other filters;

wherein the filters are stored in said first and second blinders and removed therefrom and inserted in said viewing lens housing and vice-versa.

15. The eyeguard housing assembly in accordance with claim 14 and further comprising a first eyeguard mounted on said first blinder, a second eyeguard mounted on said second blinder, and a third eyeguard mounted on said viewing lens housing, said third eyeguard being rotatable to complement a selected one of said first and second eyeguards.

16. The eyeguard housing assembly in accordance with claim 14 wherein said first blinder is movable on said first arm member and said second blinder is movable on said second arm member.

17. The eyeguard housing assembly in accordance with claim 16 wherein said blinders are automatically locked in place on said arm members upon completion of selected movement of said blinders thereon.

* * * * *